(12) United States Patent
Rogers et al.

(10) Patent No.: US 12,458,319 B2
(45) Date of Patent: Nov. 4, 2025

(54) FREE STANDING AUSCULTATION DEVICE

(71) Applicant: Solventum Intellectual Properties Company, Maplewood, MN (US)

(72) Inventors: Daniel J. Rogers, Grant, MN (US); William Bedingham, Woodbury, MN (US); J. Peter Robinson, Lancashire (GB)

(73) Assignee: Solventum Intellectual Properties Company, Maplewood, MN (US)

( * ) Notice: Subject to any disclaimer, the term of this patent is extended or adjusted under 35 U.S.C. 154(b) by 228 days.

(21) Appl. No.: 18/253,984

(22) PCT Filed: Dec. 10, 2021

(86) PCT No.: PCT/US2021/062865
§ 371 (c)(1),
(2) Date: May 23, 2023

(87) PCT Pub. No.: WO2022/125935
PCT Pub. Date: Jun. 16, 2022

(65) Prior Publication Data
US 2024/0008836 A1    Jan. 11, 2024

Related U.S. Application Data

(60) Provisional application No. 63/199,176, filed on Dec. 11, 2020.

(30) Foreign Application Priority Data

Dec. 1, 2021 (WO) .................. PCT/IB2021/061188

(51) Int. Cl.
*A61B 7/04* (2006.01)

(52) U.S. Cl.
CPC ............ *A61B 7/04* (2013.01); *A61B 2503/06* (2013.01); *A61B 2562/0204* (2013.01)

(58) Field of Classification Search
CPC .................. A61B 7/04; A61B 2503/06; A61B 2562/0204
See application file for complete search history.

(56) References Cited

U.S. PATENT DOCUMENTS

| | | | |
|---|---|---|---|
| 4,200,169 A | | 4/1980 | MacDonald, III et al. |
| 4,770,270 A | | 9/1988 | Grimm |
| 4,898,179 A | * | 2/1990 | Sirota ...................... A61B 7/04 |
| | | | 600/595 |
| 5,737,429 A | † | 4/1998 | Lee |
| 5,945,640 A | | 8/1999 | Rossini et al. |
| 9,973,847 B2 | | 5/2018 | Wong |
| D820,981 S | | 6/2018 | Johnson |

(Continued)

OTHER PUBLICATIONS

International Search Report for PCT International Application No. PCT/US2021/062865, mailed on Feb. 25, 2022, 3 pages.

*Primary Examiner* — Andrew Sniezek

(57) ABSTRACT

An auscultation device having a chest piece with a sound output aperture in fluid communication with a diaphragm on a bottom surface of the chest piece. A digital stethoscope component with a sound input aperture and a connector fluidly connecting the sound output aperture to the sound input aperture. The connector is designed such that the auscultation device is free standing on a horizontal surface.

19 Claims, 11 Drawing Sheets

(56) References Cited

U.S. PATENT DOCUMENTS

| | | |
|---|---|---|
| 2006/0174889 A1* | 8/2006 | Noble ............... A61M 16/0666 |
| | | 128/207.14 |
| 2011/0096936 A1† | 4/2011 | Gass |
| 2013/0150754 A1 | 6/2013 | Rogers et al. |
| 2014/0107515 A1† | 4/2014 | Lee |
| 2015/0190109 A1 | 7/2015 | Christensen et al. |
| 2015/0257728 A1 | 9/2015 | Ferzli et al. |
| 2016/0066797 A1 | 3/2016 | Lee et al. |
| 2016/0317117 A1* | 11/2016 | Mason ..................... A61B 7/04 |
| 2019/0083056 A1 | 3/2019 | Abiri |

\* cited by examiner
† cited by third party

FREE STANDING AUSCULTATION DEVICE

CROSS REFERENCE TO RELATED APPLICATIONS

This application is a national stage filing under 35 U.S.C. 371 of PCT/US2021/062865, filed Dec. 10, 2021, which claims the benefit of U.S. Application No. 63/199,176, filed Dec. 11, 2020, and PCT/IB2021/061188, filed Dec. 1, 2021, the disclosure of which is incorporated by reference in its/their entirety herein.

FIELD

The present disclosure generally relates to auscultation and, more particularly, to a wireless and tubeless auscultation device.

SUMMARY

An auscultation device according to the various embodiments of the present disclosure includes a chest piece that can have two sides—an adult side and a pediatric side, a digital stethoscope component, and a connector for connecting the chest piece and digital stethoscope component. The connector can enable a user to position the device in multiple configurations—by way of example, for use of adult side of the chest piece, for use of the pediatric side of the chest piece, and a flattened or storage position, such as for placing the device in a user's pocket or other storage location.

The connector can comprise a first end, a second end, and an angled and relatively rigid portion therebetween. The first end can be operably couplable with the chest piece and can be rotatably disposed in an aperture presented in the chest piece such that the digital stethoscope component can be rotated relative thereto, such as at ninety (90) degree—or other—increments between the various positions or configurations. The second end can include threads or other structure thereon for coupling, threadably or otherwise, with a digital stethoscope component (such as threaded portion included thereon) to connect the connector and digital stethoscope component. This enables a chest piece to be connected to a digital stethoscope module and used without rubber tubing and metal barb connectors.

In another embodiment, an auscultation device without the binaural tubing attached for analog signals to a user's ears can be designed such that the digital stethoscope component is attached in a specific manner to the chest piece with a suitably designed connector, such that the binaural free auscultation device will free stand on a horizontal surface on all or a portion of the bottom surface of the chest piece.

This provides useful ergonomics while using the auscultation device since it can be easier to manipulate the unit on a patient without the device tending to tip over taking the chest piece away from the body, it can be rested directly onto a lying patient to capture body sounds free of manipulation noises from the user's hand, and/or it can allow for the unit to stand up while at rest and not in use. The coupling connection between the two devices and their respective weights (chest piece and digital stethoscope) must be designed at an appropriate angle and/or length in order for the combined axial balance point of the chest piece and digital stethoscope component to be within the bottom surface of the chest piece to prevent tipping while resting on a horizontal surface. In some embodiments, it may be necessary to weight the chest piece to enhance free standing and/or the transmission of body sounds through the chest piece while using the device in a hands-free mode.

DETAILED DESCRIPTION

Figure 16:
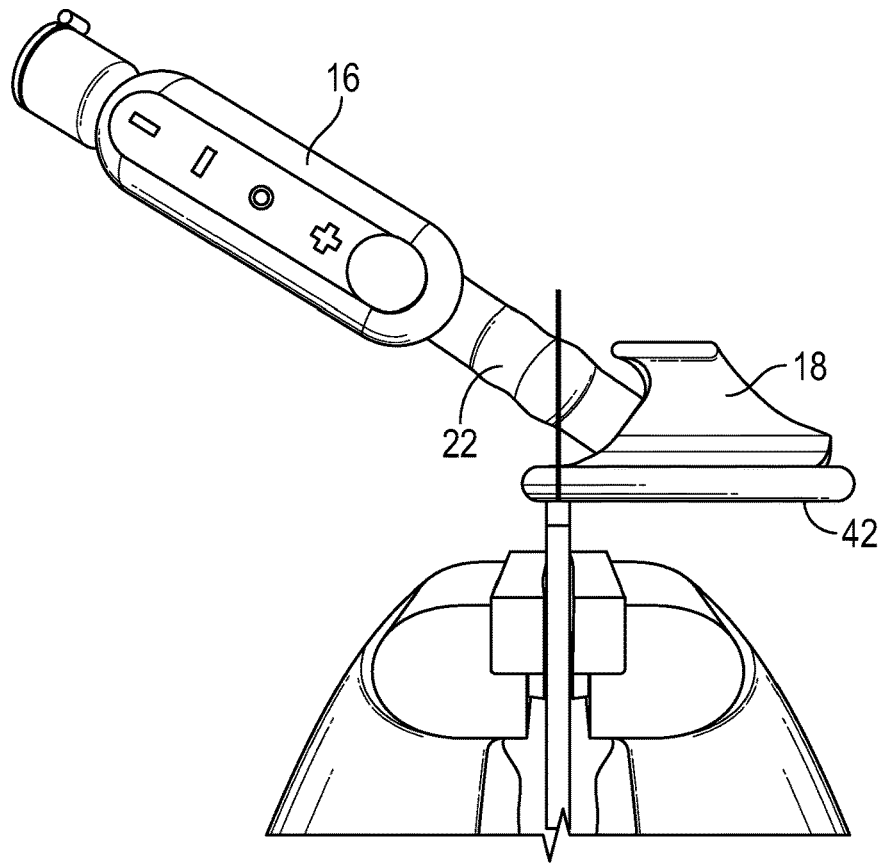
FIG. 16 is a side view of another auscultation device balancing on the chest piece, which enables the unit to free stand on a horizontal surface.

As used herein, "free standing" means that the auscultation device having a chest piece connected to an attached digital stethoscope component (without any charging wires or speaker wires connected) can be supported by resting only on the bottom surface of the chest piece on a horizontal surface. For the purposes of free standing, the auscultation device is either not provided with an analog binaural (binaural free without tubing and a headset for placement in the ears) or the device is tested on the horizontal surface without an optional removable analog binaural attached to the digital stethoscope component. See, for example, FIG. 16 depicting an auscultation device with the optional analog binaural removed and not attached to the output connector on the end of the digital stethoscope component. For the purposes of free standing, it is not necessary that the entire bottom surface of the chest piece is in contact with the horizontal surface and the auscultation device may rest and balance on only a portion of the bottom surface such as the rear edge closer to where the digital stethoscope component is attached with the opposite front edge raised slightly from the horizontal surface.

As used herein, a "horizontal surface" means a plane that is level within +/−0.5 degrees of level (0 degrees). As used herein, a "substantially horizontal surface" means a surface a person without measuring and only using the naked eye would consider to be level such as a tabletop, a countertop, a desktop, a floor, or other surface people normally assume are generally level.

Figure 1:
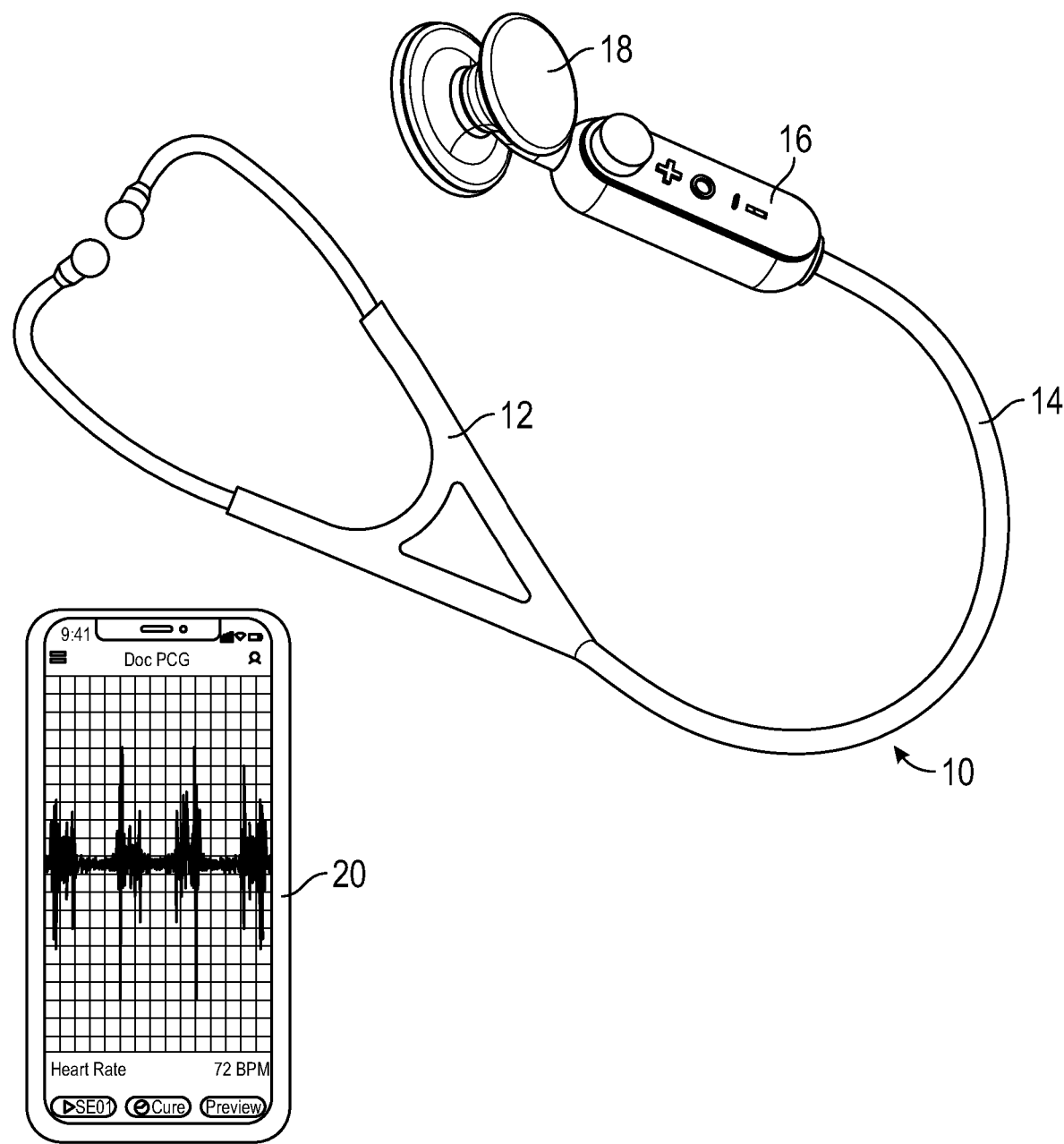
FIG. 1 is a perspective view of an auscultation device according to a first embodiment of the present disclosure.

Referring to FIG. 1, in a first embodiment of the present disclosure, a digital stethoscope 10 can include a headset 12, binaural tubing 14, a digital stethoscope component 16, and a chest piece 18. The digital stethoscope component can include a button that can be toggled between analog and amplified/digital listening modes. The digital stethoscope component can provide multiple DSP (digital signal processing) sound filtering modes for each sensor. The chest piece can include two tunable diaphragms (adult and pediatric), which can enable a user to listen for both high and low frequency sounds. The digital stethoscope component and chest piece can be connected with a connector. Bluetooth® wireless connectivity gives the digital stethoscope component the ability to pair with a mobile device 20, such that a user can visualize, record, save and playback sounds. In this embodiment, the headset and digital stethoscope component can be connected by a connector that will be discussed in greater detail below with respect to FIGS. 3-7.

Figure 2:
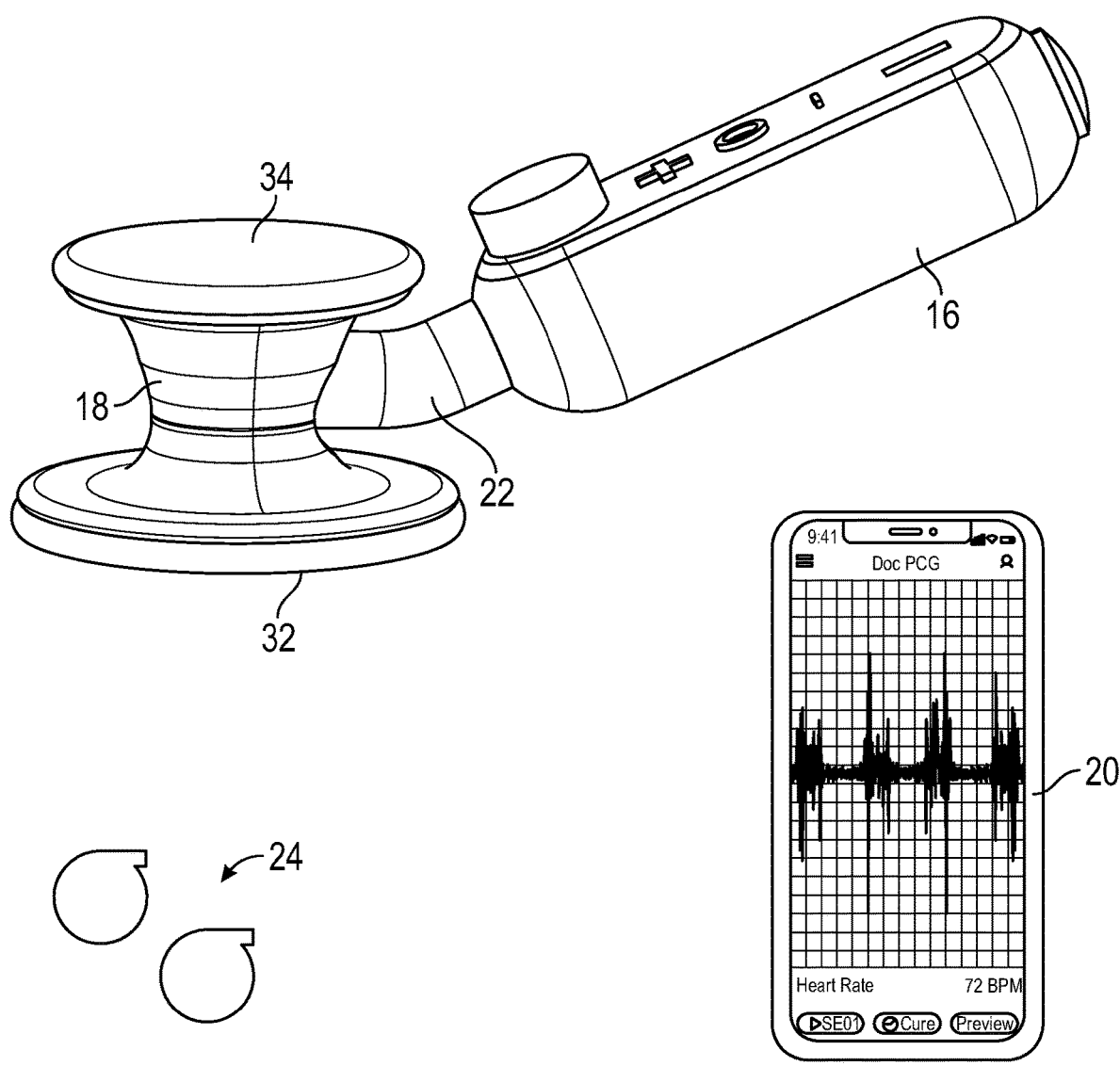
FIG. 2 is a perspective view of an auscultation device according to a second embodiment of the present disclosure.
Figure 3:
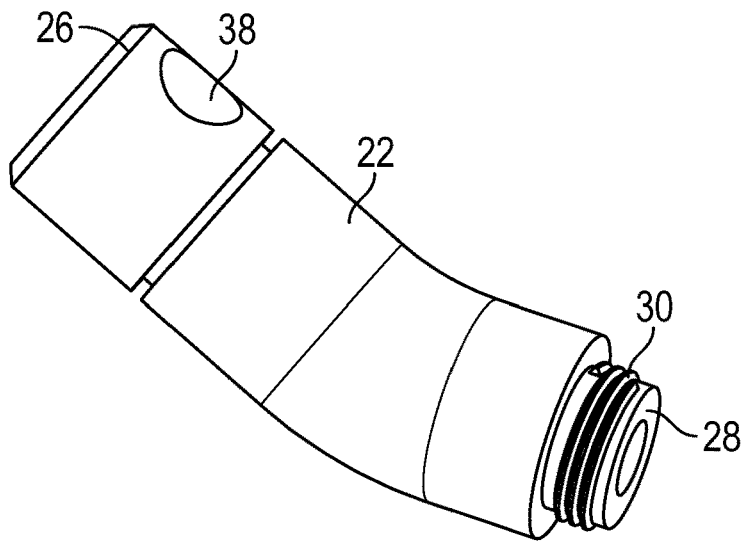
FIG. 3 is a perspective view of a connector of an auscultation device according to an embodiment of the present disclosure.

Referring to FIG. 2, in a second embodiment of the present disclosure, a wireless auscultation device is depicted. In this embodiment, the device does not include a headset or binaural tubing, i.e., the digital stethoscope component is not connected to tubing, such as depicted in FIG. 1. The device as depicted in FIG. 2 includes a digital stethoscope component 16, a chest piece 18, and a connector 22 connecting the digital stethoscope component and chest piece. The digital stethoscope component can provide multiple DSP (digital signal processing) sound filtering modes for each sensor. Bluetooth® wireless connectivity gives the digital stethoscope component the ability to pair with a mobile device, such that a user can visualize, record, save and playback sounds—and also listen to sounds through headphones 24, which can be either wired (connected to the mobile device or connected directly to the digital stethoscope component) or wireless using, by way of example, Bluetooth® wireless connectivity.

The device includes a mechanical sensor/chest piece. Examples of mechanical chest pieces are depicted and described in U.S. Pat. Nos. 4,200,169, 4,770,270, 5,945,640, and D820,981, the disclosures of which are incorporated by reference herein. The device includes an electronic module. Examples of electronic modules are depicted and described in U.S. Pat. No. 9,973,847, the disclosure of which is incorporated by reference herein.

Figure 7:
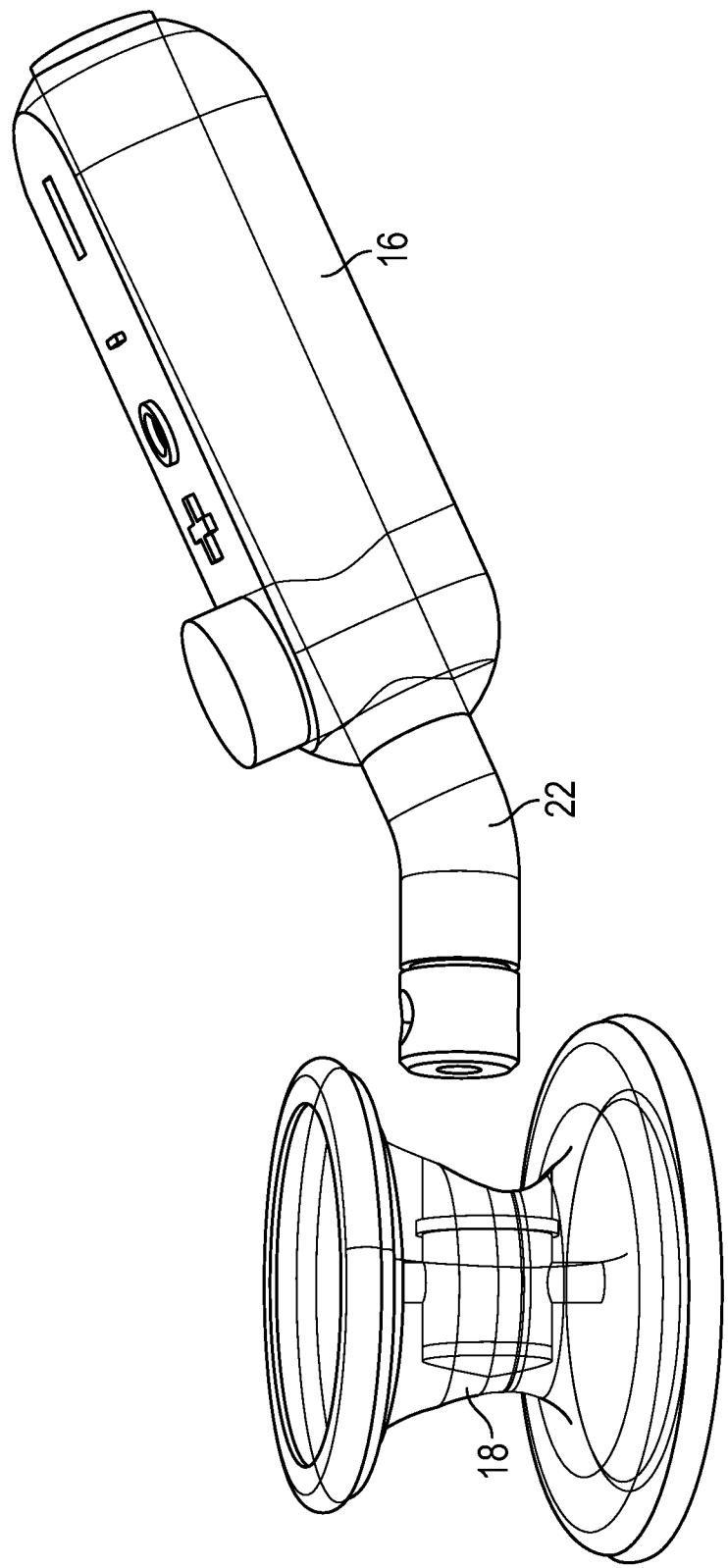
FIG. 7 is a partially exploded perspective view of an auscultation device according to the embodiment of FIG. 2 depicting a chest piece separate from a connector connected to a digital stethoscope component.

Referring to FIGS. 3-6, connector can comprise a first end 26, a second end 28, and an angled and portion therebetween. The second end can include threads 30 thereon for threadably coupling with a threaded portion included on the digital stethoscope component to connect the connector and digital stethoscope component (by way of example, via a threaded attachment section (M9×0.75)). This enables a chest piece to be connected to a digital stethoscope module without the need for rubber tubing and metal hose barb connectors. FIG. 7 depicts the second end threadably coupled with a threaded portion included on the digital stethoscope component. The connector can be formed of a number materials, including aluminum, stainless steel, plastic, composite material.

Figure 5:
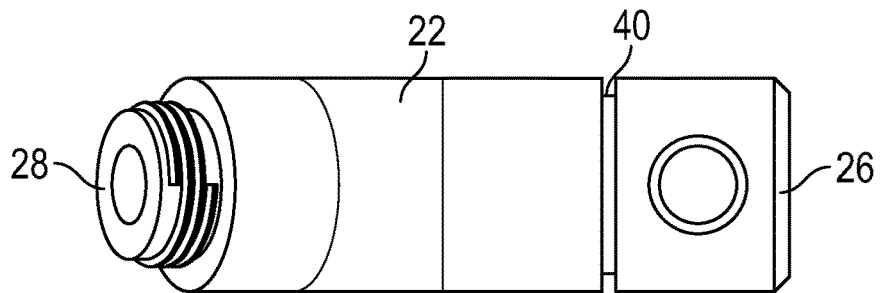
FIG. 5 is a top plan view of a connector of an auscultation device according to an embodiment of the present disclosure.
Figure 6:
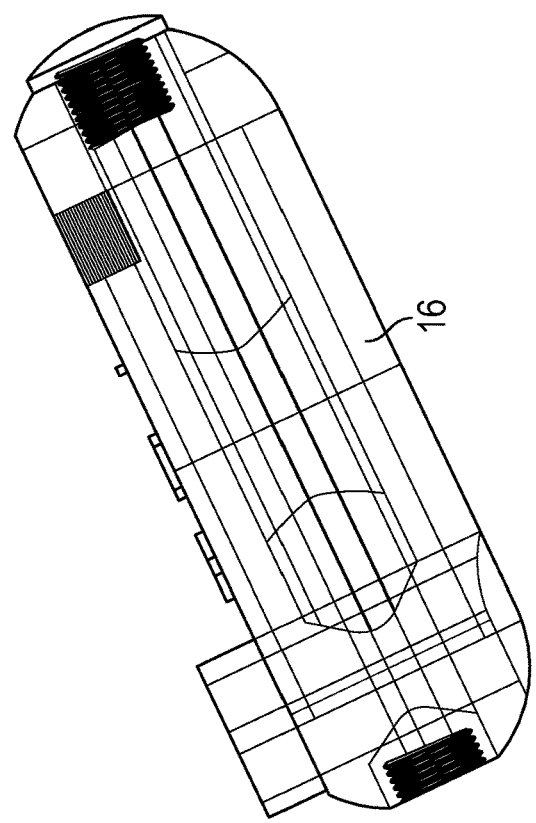
FIG. 6 is a partially exploded side elevational view of an auscultation device according to the embodiment of FIG. 2 depicting a chest piece, connector, and digital stethoscope component separately.
Figure 6:
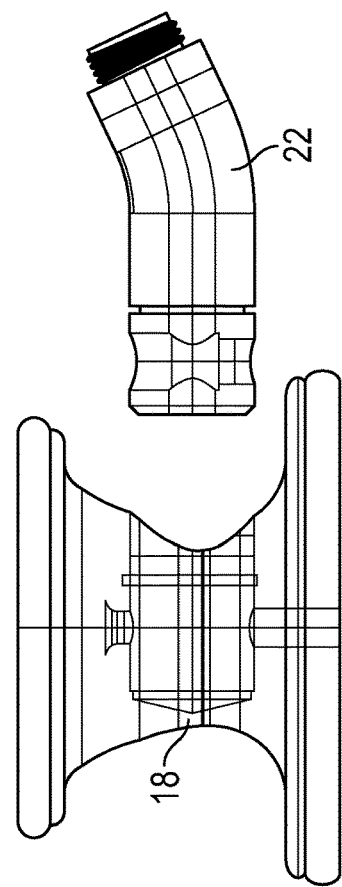
Figure 8:
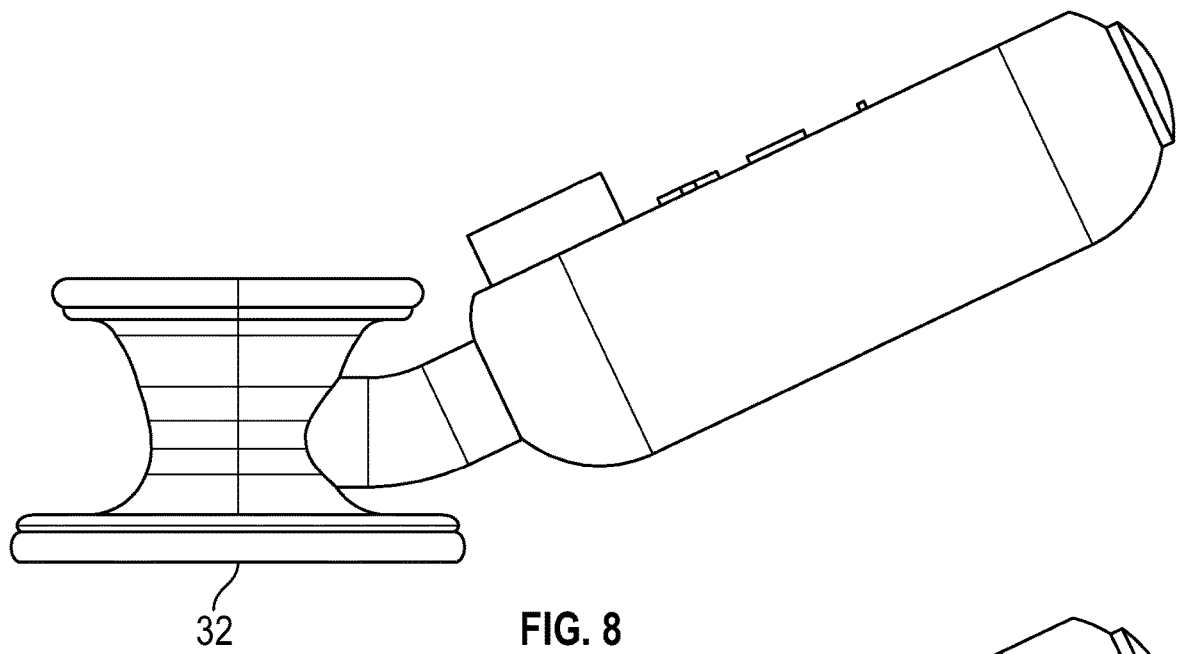
FIG. 8 is a side elevational view of an auscultation device according to the embodiment of FIG. 2 wherein the device is a first configuration for use of adult, large side of the chest piece.
Figure 9:
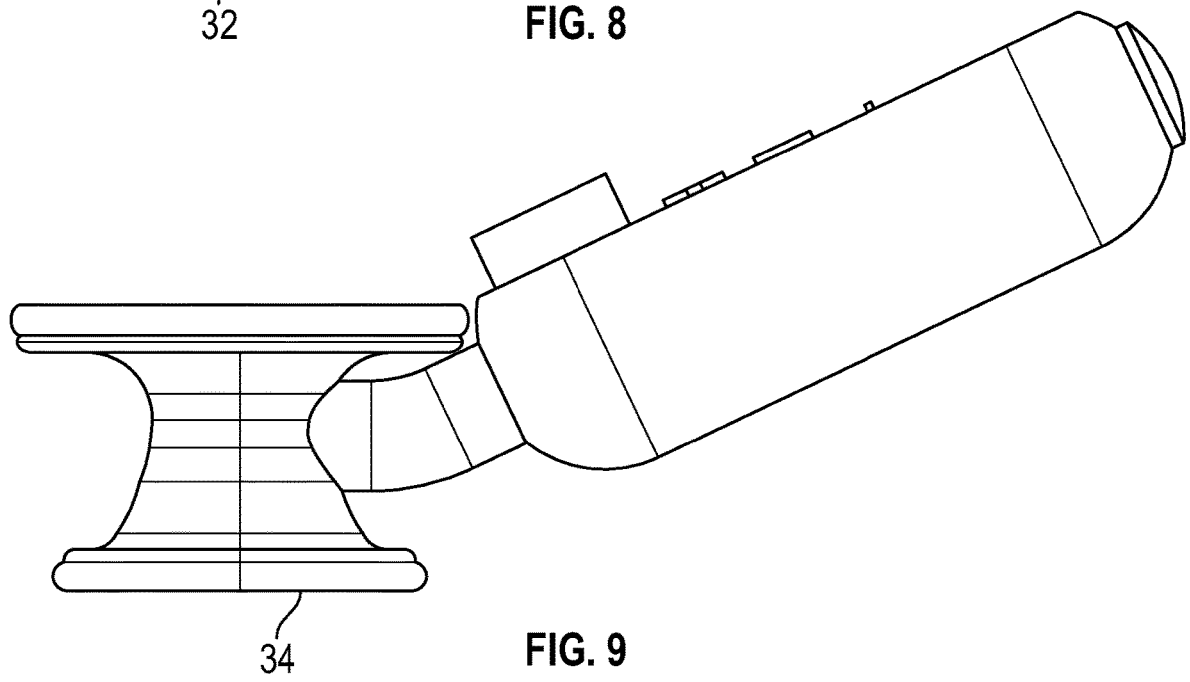
FIG. 9 is a side elevational view of an auscultation device according to the embodiment of FIG. 2 wherein the device is a second configuration for use of pediatric, small side of the chest piece.
Figure 10:
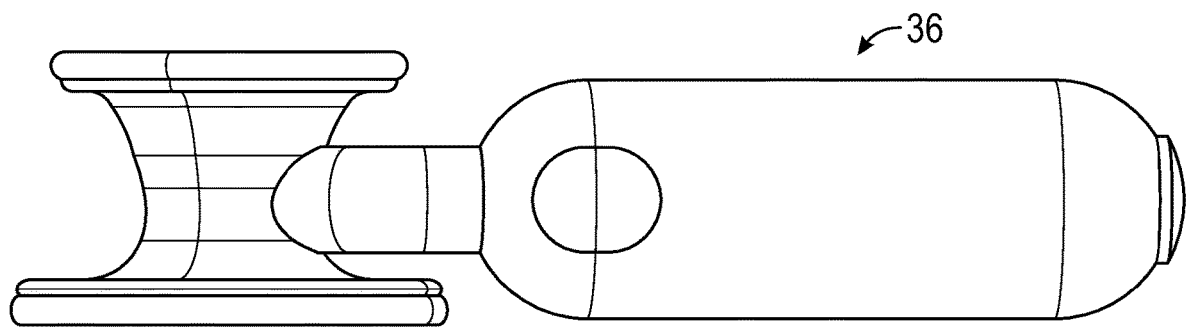
FIG. 10 is a side elevational view of an auscultation device according to the embodiment of FIG. 2 wherein the device is a third configuration for storage.

The first end can be operably coupled with the chest piece and can be rotatably disposed in an aperture presented in the chest piece such that the digital stethoscope component can be rotated relative thereto, such as at ninety (90) degree increments between the positions—use of adult side 32 of the chest piece (FIG. 8), use of the pediatric side 34 of the chest piece (FIG. 9), and a flattened or storage position 36 (FIG. 10). To connect the first end and the chest piece, the first end of the connector can be positioned and slid into the aperture on the chest piece. A spring and ball bearing 38 can be included in a "sound aperture" of the connector (referring to FIG. 6, see the orthogonal hole in the connector that lines up with sound apertures in the adult and pediatric sound cavities in the chest piece). Indexing to specific 360-degree locations, allowing for different sound collection and passage by the chest piece, is done through the use of the spring and ball bearing held within the first end of the connector within the chest piece. Specifically, the ball bearing and spring are compressed as the first end of the connector is rotated until a position within the chest piece is reached that allows for reduced compression of the spring and ball bearing components. The reduced compression thereby holds the first end of the connector in place within the 360 degrees of rotation, allowing for the selection of chest piece sound collection and passage. A retaining ring clip can be positioned in a recessed ring 40 of the connector, such as behind the sound aperture in the connector as shown in FIG. 5. Once the clip is pushed in and seated, it can inhibit the connector from being removed from the chest piece.

Figure 4:
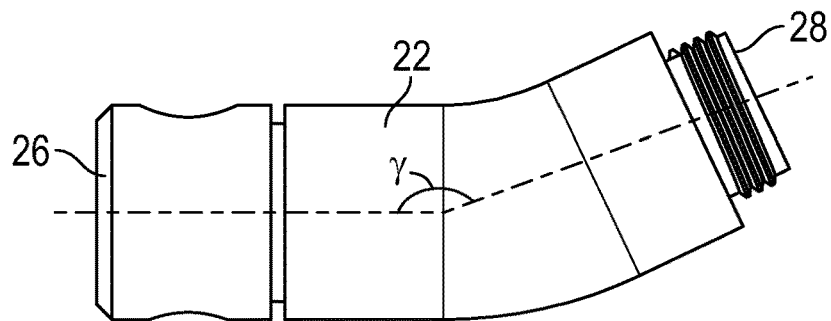
FIG. 4 is a side elevational view of a connector of an auscultation device according to an embodiment of the present disclosure.

The first and second ends of the connector can be disposed such that an obtuse angle α is formed relative to each other and a first center line of the first end intersects with a second centerline of the second end forming the obtuse angle α as shown in FIG. 4. In various embodiments, the angle α can be between about one hundred and seventy-five (175) degrees and about one hundred and thirty (130) degrees. In further embodiments, the angle α can be between about one hundred and seventy (170) degrees and about one hundred and forty (140) degrees. In yet further embodiments, the angle α can be between about one hundred and sixty five (165) degrees and about one hundred and forty five (145) degrees. In yet further embodiments, the angle α can be between about one hundred and sixty (160) degrees and about one hundred and forty five (145) degrees. In yet further embodiments, the angle α can be about one hundred and fifty-five (155) degrees.

The connector enables a chest piece to be connected directly to a digital stethoscope component without the need for rubber tubing and metal hose barb connectors. The angled section allows the chest piece and digital stethoscope component to be easily held in an optimal position during auscultation. The pivot section allows the user to easily twist and alternate the chest piece from the adult side to the pediatric side. The pivot feature also allows the digital stethoscope component to swing out of the way when not in use and take up less space. When a user rotates the chest piece from the adult to pediatric side, the ball bearing retracts and then snaps into position and seals the sound aperture in the upper side of the chest piece (that is, the unused side). A continuous opening extends from the sound aperture of lower side of the chest piece (that is, the active side against a patient's body) into the sound aperture of the connector (the spring does not block sound) through the connector body and out to the second end of the connector that is connected to the digital stethoscope component.

The design further protects the more sensitive stethoscope component during a fall or during rough handling. The embodiments of the present disclosure also enable a wireless solution for practitioners. It combines the best features of traditional mechanical stethoscopes with the latest Bluetooth® Low Energy digital solutions.

Figure 11:
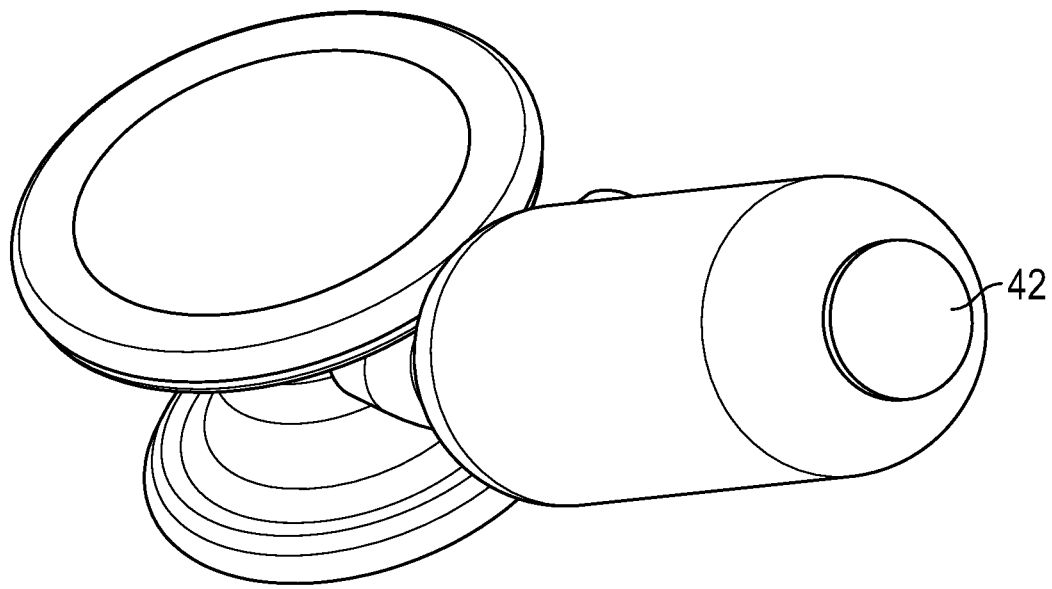
FIG. 11 is a perspective view of an auscultation device according to an embodiment of the present disclosure.
Figure 12:
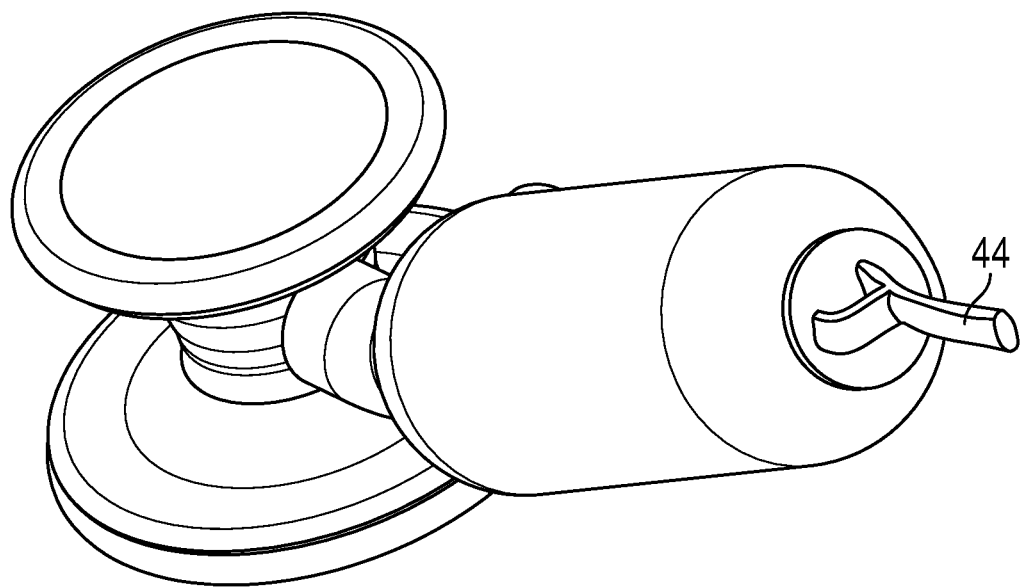
FIG. 12 is a perspective view of an auscultation device according to an embodiment of the present disclosure.
Figure 13:
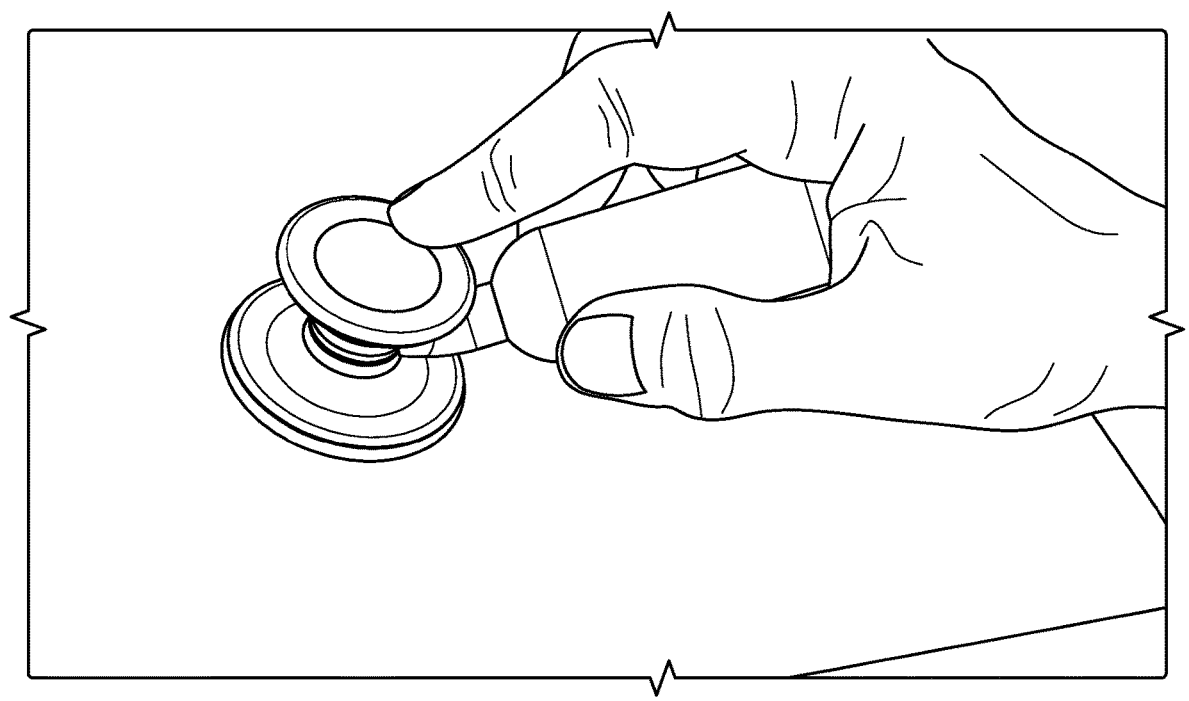
FIG. 13 is a side elevational view of an auscultation device according to the embodiment of FIG. 2 wherein the device is a first configuration being used with the adult side of the chest piece.
Figure 14:
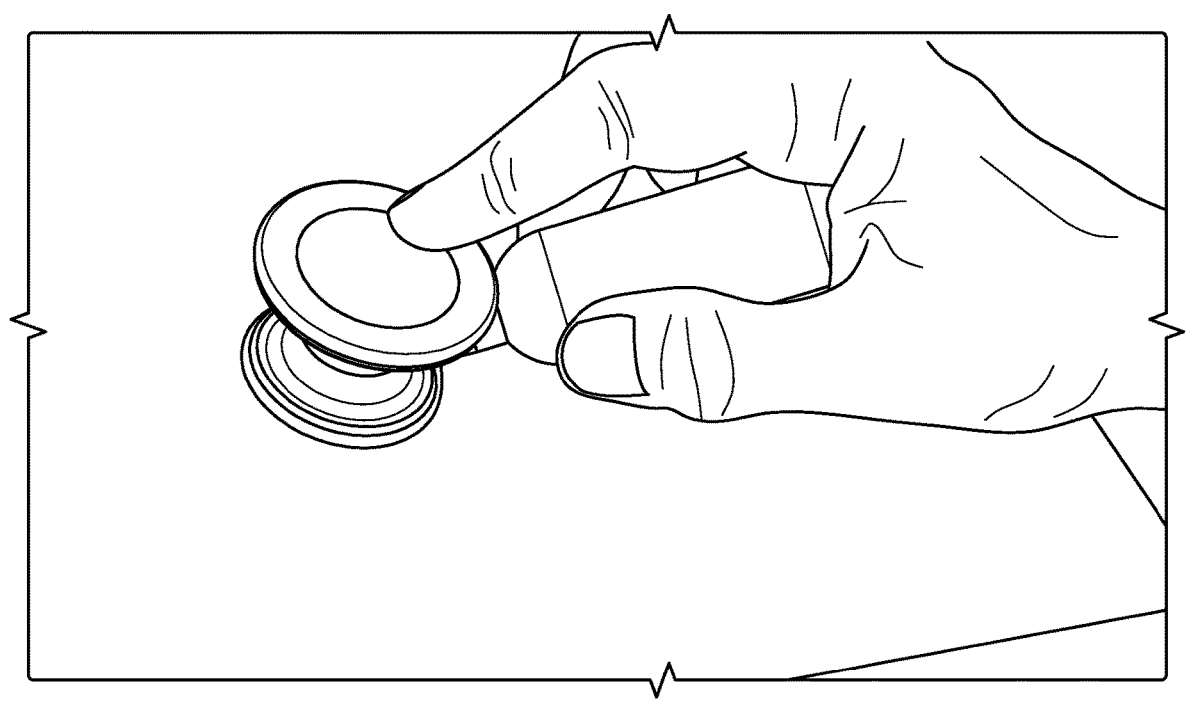
FIG. 14 is a side elevational view of an auscultation device according to the embodiment of FIG. 2 wherein the device is a second configuration being used with the pediatric side of the chest piece.
Figure 15:
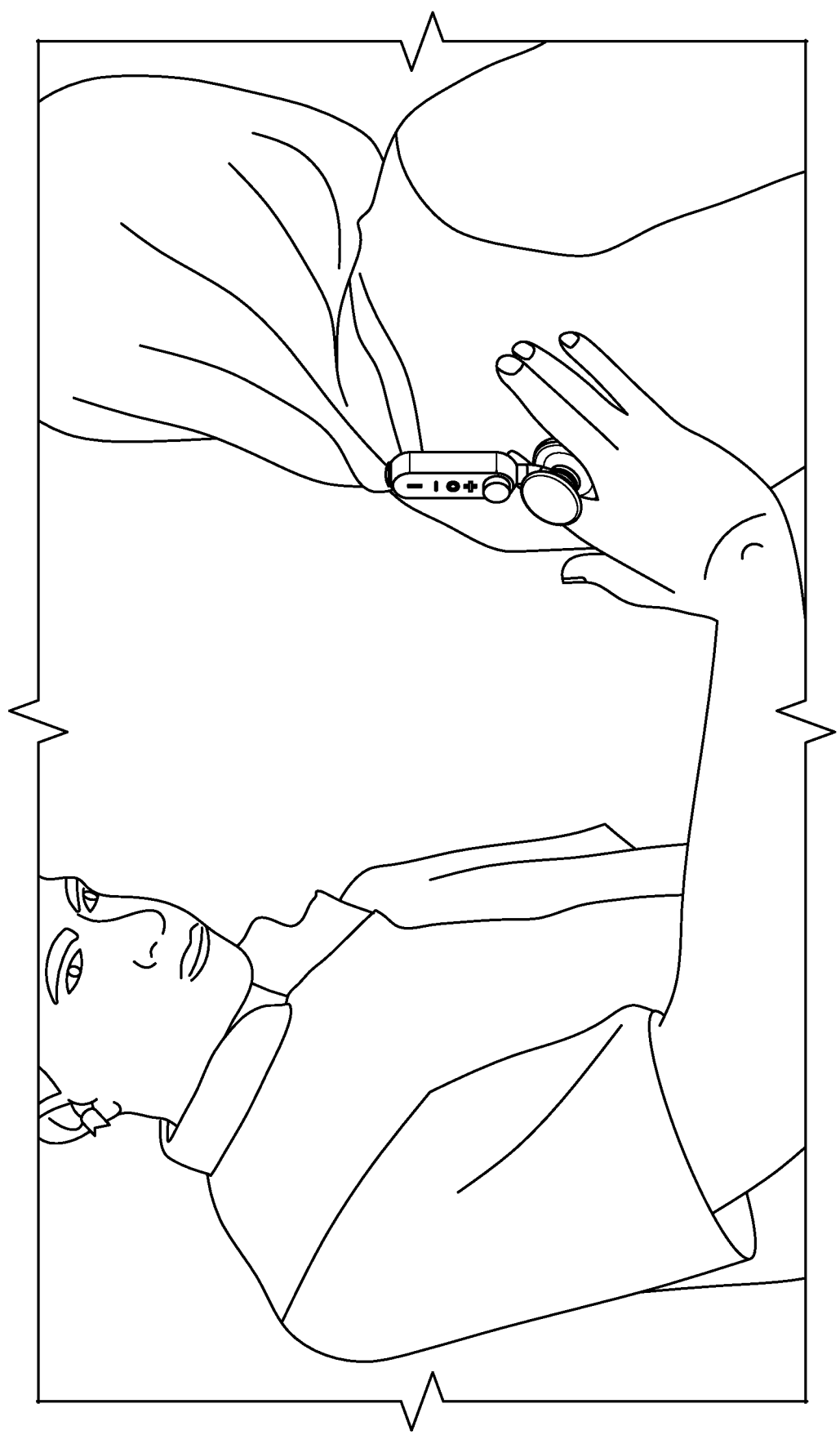
FIG. 15 is a side elevational view of an auscultation device according to the embodiment of FIG. 2 wherein the device is a first configuration being used with the adult side of the chest piece.

Referring to FIGS. 11 and 12, a hose barb section that would normally be attached to the tubing leading to the headset can be removed and replaced with an end cap 42 (by way of example, a threaded (M8×0.75) end cap). The endcap provides smooth waterproof surface which can be modified to provide additional utility. In FIG. 12, a tether 44 can be included on the end cap. Alternatively, the hose barb section may be removably covered with a protective rubber endcap with a tubular internal construction.

Figure 17:
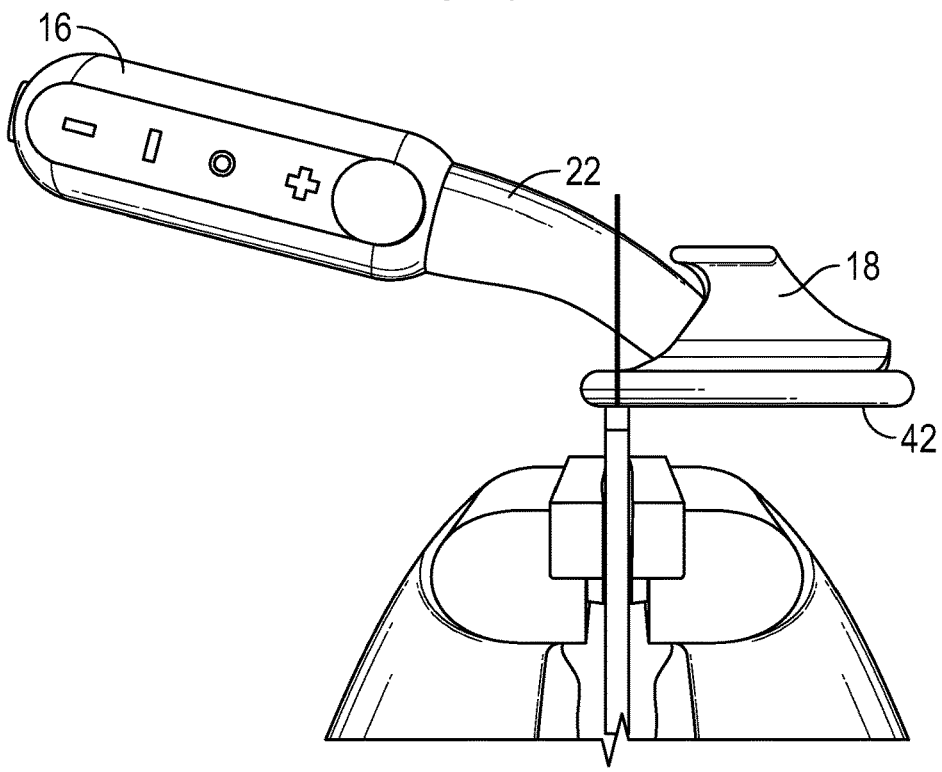
FIG. 17 is a side view of another auscultation device balancing on the chest piece, which enables the unit to free stand on a horizontal surface.
Figure 18:
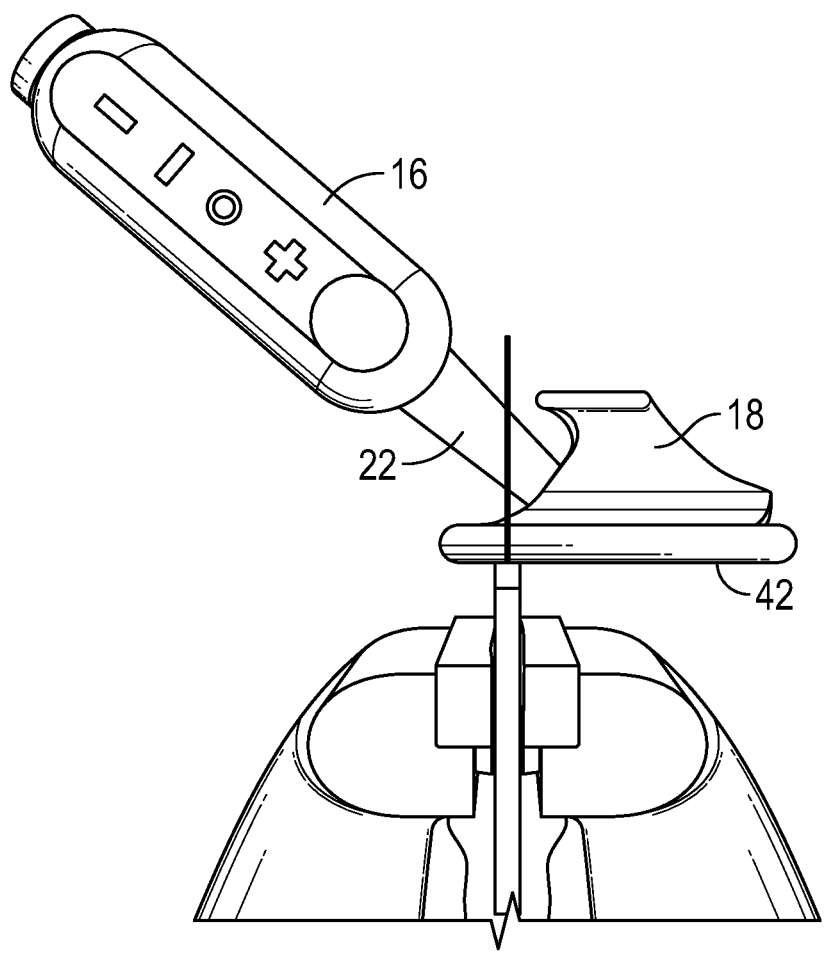
FIG. 18 is a side view of another auscultation device balancing on the chest piece, which enables the unit to free stand on a horizontal surface.

Referring to FIGS. 16, 17, and 18, in another embodiment of the present disclosure, a wireless auscultation device is depicted. In this embodiment, the device does not include a non-removable analog headset or binaural tubing, i.e., the digital stethoscope component is not connected by tubing to the user's ears, such as depicted in FIG. 1. However, the device may include a quick disconnect user removable analog binaural headset and tubing. The device includes a digital stethoscope component 16, a chest piece 18, and a connector 22 connecting the digital stethoscope component and chest piece. The digital stethoscope component can provide multiple DSP (digital signal processing) sound filtering modes for each sensor. Bluetooth® wireless connectivity gives the digital stethoscope component the ability to pair with a mobile device, such that a user can visualize, record, save and playback sounds—and also listen to sounds through electronic headphones, which can be either wired (connected to the mobile device or directly to the digital stethoscope component) or wireless using, by way of example, Bluetooth® wireless connectivity. One suitable digital stethoscope component is the Eko CORE digital attachment made by Eko. An example of a digital stethoscope component module is depicted and described in U.S. Pat. No. 9,973,847, the disclosure of which is incorporated by reference herein.

The device includes a mechanical sensor/chest piece 18. The chest piece has a bottom surface 42 that comprises a diaphragm and an outer rim that retains the diaphragm to the chest piece. In use, the bottom surface is placed onto the patient's body. The chest piece has a sound output aperture in fluid communication with the diaphragm for sending sound waves to the digital stethoscope component 16 for electronic processing. The chest piece has an upper housing for gripping by the user to position the chest piece on a patient. Suitable chest pieces are manufactured and sold by 3M Corporation under the Littmann® brand. Examples of mechanical chest pieces are also depicted and described in U.S. Pat. Nos. 4,200,169, 4,770,270, 5,945,640, and D820,981, the disclosures of which are incorporated by reference herein.

The auscultation devices in FIGS. 16-19 are all free standing on a horizontal surface. As seen, the center of balance in the X-direction (between the rearmost edge of the digital stethoscope component 16 and the front edge of the bottom surface 42) as illustrated by the red line is within the bottom surface such that the devices will balance on an approximately inch-wide edge shown in the photos. Thus, if the 0.1 inch-wide edge depicted in the photos was instead replaced with a horizontal surface the devices will free stand just like they are in the photos. Furthermore, the devices will stand up on a substantially horizontal surface when not in use for convenient storage.

In some embodiments to achieve a free standing auscultation device, the connecting tube 22 between the chest piece 18 and the digital stethoscope component 16 should be relatively short such as between 0.5 to 2 inches, or between 1 to 1.75 inches. A shorter connecting tube moves the center of gravity of the digital stethoscope component closer to the chest piece making the device more stable when free standing on a horizontal surface.

In some embodiments, it helps if the longitudinal axis of the digital stethoscope component is disposed at an angle to the horizontal surface. The steeper the angle the farther forward the balance point in the X-direction is shifted forward towards the front edge of the bottom surface 42. However, a steep angle such as a 90-degree angle would be likely unwieldly and more difficult to use, particularly when fitting the chest piece under a blood pressure cuff. Similarly, an angle of 0 degrees with the digital stethoscope component parallel to the horizontal surface may result in the digital stethoscope component interfering more with the user's hand while holding the device during use. Thus, at least some angle can be beneficial to ergonomics and angles within a certain range can enable the auscultation device to more readily free stand. In various embodiments, the angle between the longitudinal axis of the digital stethoscope component and the horizontal surface can be between 10 to 50 degrees, or between 15 to 45 degrees, or between 18 to 42 degrees, or between 30 to 42 degrees for a more ergonomic device.

Figure 19:
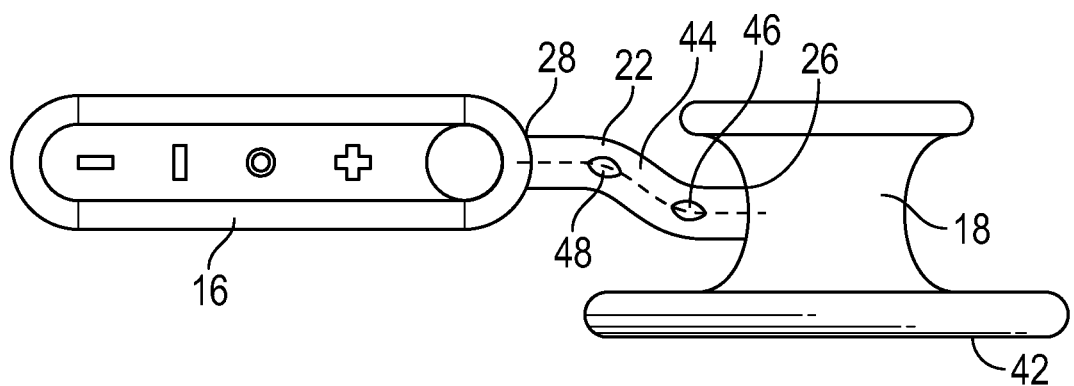
FIG. 19 is a side view of another auscultation device with a connection between the chest piece and digital stethoscope component that enables the unit to free stand on a horizontal surface.

In some embodiments, a double angle offset tubular connector 22 as seen in FIG. 19 may be utilized to raise the longitudinal axis of the digital stethoscope up away from the patient's body allowing room for an ergonomic hand hold of the chest piece under the digital stethoscope component or for grasping the digital stethoscope component like a trowel handle as illustrated.

In some embodiments, it helps if the weight of the device when free standing on a horizontal plane is within a certain range for improved auscultation sounds. To test the weight, a scale with a horizontal surface is tared to zero and the device is then placed onto the horizontal surface of the scale to measure the weight when free standing. With a certain weight range, the auscultation device may work well on a patient's body while free standing without any additional force being supplied by the clinician's hands. This can reduce manipulation noises and/or allow the clinician to perform other tasks while listening to body sounds. To achieve this effect, the chest piece 18 may be made of heavier material such as a thicker walled metallic housing. Optionally, attachable tuning weights can be added to the chest piece to enable the auscultation device to free stand with a specific weight on the scale.

In various embodiments, the weight of the auscultation device when free standing on a horizontal surface of a scale can be between 0.2 to 1.5 kg, or between 0.2 to 0.5 kg, or between 0.2 to 0.3 kg. Lighter weights between 0.2 to 0.3 kg have been tested in the laboratory and found to enhance the sound quality, especially bass notes, from various Littmann® stethoscope chest pieces and tunable diaphragms while at the same time minimizing or eliminating background noise. At weights of about 0.4 to 0.5 kg and higher the bass response starts to drop off quickly and for certain body sounds that may be undesirable.

The connection tube 22 between the chest piece and the digital stethoscope component can be made by various different embodiments. For example, the connection tube used in FIGS. 3-6 may be employed.

Alternatively, a hose barb made be threaded into the sound output aperture on the chest piece and a hose barb threaded into the sound input aperture of the digital stethoscope component. Thereafter straight binaural tubing may be used to connect the two devices as seen in FIG. 16. Note that the second end of the digital stethoscope component 16 in FIG. 16 not connected to the chest piece has a connector for attaching an optional analog binaural ear set.

Alternatively, instead of constant diameter binaural tubing of FIG. 16, a varying diameter tube with a curvature or an arc can be used as seen in FIG. 17. Depending on how the arc is rotated when attached to the chest piece, the digital stethoscope component can be raised further away from the horizontal surface or brought closer to the horizontal surface changing the balance point within the bottom surface. The diameter of the tube end connected to the digital stethoscope component may be larger than the diameter of the tube end connected to the chest piece such that the diameter of the tube tapers. One end or both ends of the tube can be counter sunk to match the curvature of the chest piece (if any) and the curvature on the end of the digital stethoscope component helping to provide a more polished and integrated look while still free standing as seen in FIG. 16. The connection tube may be made from a flexible material, such as a polymer, or the connection tube may be made from a rigid material, such as a metal.

Alternatively, a rigid straight or conical tapered metal tubing having two threaded ends can be used to connect the chest piece to the digital stethoscope component as seen in FIG. 17. The metal tubing can add more weight and help to shift the balance point more towards the front edge on the bottom surface of the chest piece.

Alternatively, the connector can be tubular and have a first end 26 connected to the chest piece 18 and a second end 28 connected to the digital stethoscope component and a central portion 44. A first obtuse angle 46 is present between a centerline of the first end and a centerline of the central portion. A second obtuse angle 48 is present between a centerline of the second end and the centerline of the central portion such that the first end is offset from the second end as seen in FIG. 19. In some embodiments, the centerline of the first end and the centerline of the second end are parallel to each other and in other embodiments they are not parallel to each other. The connection tube may be made from a flexible material, such as a polymer, or the connection tube may be made from a rigid material, such as a metal.

What is claimed is:

1. An auscultation device, comprising:
a chest piece including a diaphragm;
a digital stethoscope component graspable by a user; and
a connector extending between and fluidically coupling the chest piece and the digital stethoscope component;
wherein the weight of the auscultation device and the length of the connector are selected to allow the auscultation device to free stand on a horizontal surface.

2. The auscultation device of claim 1, wherein the auscultation device weighs between 0.2 to 1.5 kg.

3. The auscultation device of claim 2, wherein the connector exhibits a length between 0.5 to 2 inches.

4. The auscultation device of claim 3, wherein the digital stethoscope component defines a longitudinal axis and wherein, when the auscultation device is free standing on the horizontal surface, a non-zero angle is defined between the longitudinal axis and the horizontal surface.

5. The auscultation device of claim 4, wherein the non-zero angle is between 10 to 50 degrees.

6. The auscultation device of claim 1, wherein:
the connector comprises a first end defining a first centerline, a second end defining a second centerline, and a central portion extending between the first and second ends and defining a third centerline;
a first non-zero angle is defined between the first centerline and the third centerline; and
a second non-zero angle is defined between the second centerline and the third centerline.

7. The auscultation device of claim 6, wherein, when the auscultation device is free standing on the horizontal surface, the first centerline, the second centerline, and the horizontal surface are parallel to, and offset from, each other.

8. An auscultation device, comprising:
a chest piece including a diaphragm;
a digital stethoscope component graspable by a user; and
a connector extending between and fluidically coupling the chest piece and the digital stethoscope component;
wherein the chest piece is arranged relative to the digital stethoscope component via the connector such that a balance point is located at the chest piece to allow the auscultation device to free stand on a horizontal surface.

9. The auscultation device of claim 8, wherein the connector comprises a first end defining a first center line and a second end defining a second center line that is angled at a non-zero angle relative to the first center line.

10. The auscultation device of claim 8, wherein:
the connector comprises a first end couplable to the chest piece and defining a first centerline, a second end couplable to the digital stethoscope component and defining a second centerline, and a central portion extending between the first and second ends and defining a third centerline;
a first non-zero angle is defined between the first centerline and the third centerline; and
a second non-zero angle is defined between the second centerline and the third centerline.

11. The auscultation device of claim 10, wherein the first centerline and the second centerline are parallel to, and offset from, each other.

12. The auscultation device of claim 11, wherein, when the auscultation device is free standing on the horizontal surface, the first and second centerlines are parallel to the horizontal surface.

13. The auscultation device of claim 8, wherein the connector is curved.

14. The auscultation device of claim 8, wherein the connector comprises a length between 0.5 to 2 inches.

15. The auscultation device of claim 8, wherein the digital stethoscope component defines a longitudinal axis and wherein, when the auscultation device is free standing on the horizontal surface, a non-zero angle is defined between the longitudinal axis and the horizontal surface.

16. The auscultation device of claim 15, wherein the non-zero angle is between 10 to 50 degrees.

17. The auscultation device of claim 8, wherein the auscultation device weighs between 0.2 to 1.5 kg.

18. The auscultation device of claim 8, wherein the digital stethoscope component includes a button manually actuatable by the user.

19. The auscultation device of claim 8, wherein the connector includes a first end threadably couplable with the digital stethoscope component and a second end receivable in a cavity defined by the chest piece.

* * * * *